Jan. 7, 1969  C. B. HAVERSTOCK  3,420,728
WINDOW DISPLAY AND METHOD OF MAKING THE SAME
Filed July 6, 1964  Sheet 1 of 2

INVENTOR
CHARLES B. HAVERSTOCK

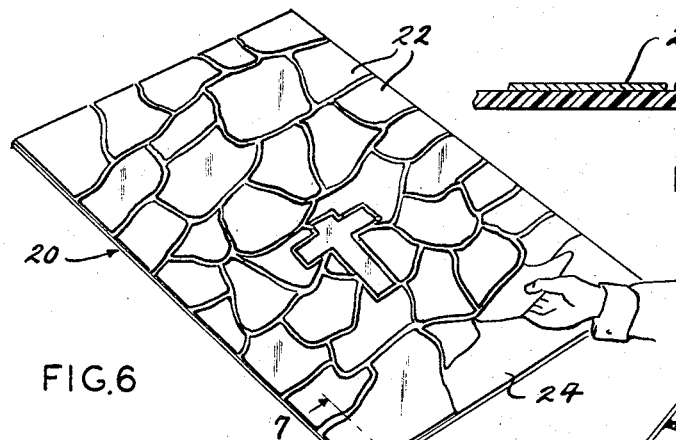
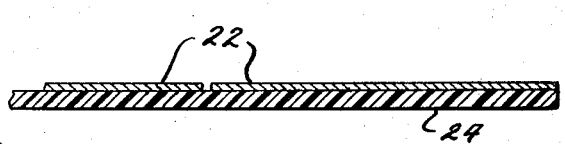
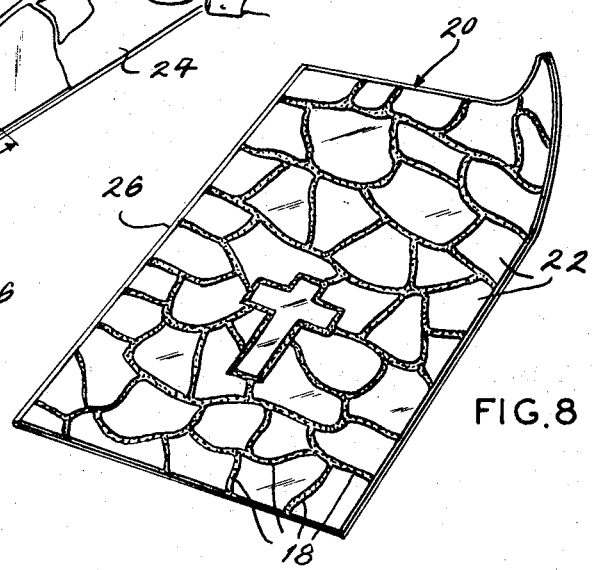
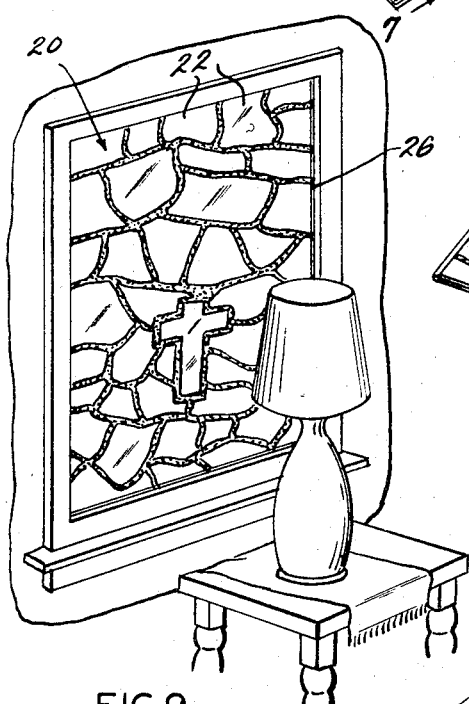
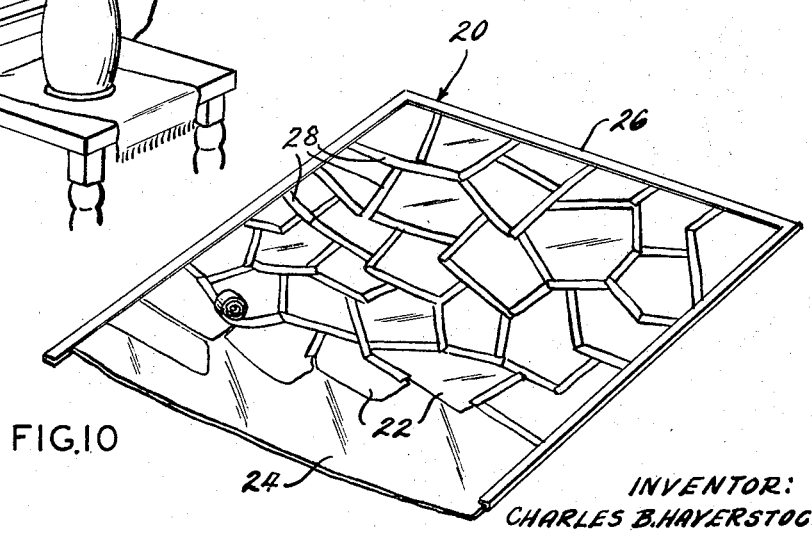
INVENTOR:
CHARLES B. HAVERSTOCK United States Patent Office 3,420,728
Patented Jan. 7, 1969

3,420,728
WINDOW DISPLAY AND METHOD OF
MAKING THE SAME
Charles B. Haverstock, 44 Frederick Lane,
Glendale, Mo. 63122
Filed July 6, 1964, Ser. No. 380,316
U.S. Cl. 161—6         4 Claims
Int. Cl. B44f 1/06; B44c 1/28

ABSTRACT OF THE DISCLOSURE

A display device for mounting in windows and on other transparent structures to simulate the appearance of a stained glass window.

---

The present invention relates generally to display devices and the like and more particularly to decorative display devices simulating stained glass windows and the like.

Many display devices have been constructed heretofore which produce a colorful and artistic effect when light passes through. Such devices include stained glass windows and other more or less permanent display devices. All of the known devices, however, are relatively complicated to construct and assembly, are costly, and require skilled and talented personnel in their construction. Furthermore, the known devices for the most part are constructed as parts of structures and therefore are limited in utility and cannot be readily changed or replaced. Display devices constructed according to the present invention, on the other hand, are relatively inexpensive, require little or no special talent or skill and can be made in an infinite variety of patterns and color schemes all of which produce a colorful and artistic effect. Furthermore, the subject devices are particularly well suited to being packaged as relatively inexpensive kits for home assembly to decorate windows during the holidays and for other purposes.

It is therefore a principal object of the present invention to provide relatively inexpensive means for decorating windows and the like.

Another object is to provide a transparent window or like display that is relatively easy to construct.

Another object is to provide decorative display means which do not require any special talent or skill to construct.

Another object is to provide inexpensive means for simulating a stained glass window or the like which can be constructed on a window pane or preassembled for mounting in a window.

Another object is to provide means for simulating a stained glass window which can be constructed without requiring any special tools.

Another object is to provide attractive colorful means for decorating a house or other structure.

Another object is to provide means simulating a stained glass window which can be constructed and installed in a window and later removed therefrom without damaging or soiling the window.

These and other objects and advantages of the present invention will become apparent after considering the following detailed specification which covers several preferred embodiments thereof in conjunction with the accompanying drawings, wherein:

FIG. 6 shows a modified form of the subject device in which the colored panels are preassembled and attached to a clear transparent sheet for later mounting in a window;

FIG. 7 is an enlarged cross-sectional view taken on line 7—7 of FIG. 6;

FIG. 8 is a perspective view of the modified structure in finished condition;

FIG. 9 is an elevational view showing the modified construction mounted in a window in front of a lamp; and FIG. 10 is an enlarged fragmentary perspective view showing another modified form of the subject device.

Figure 1:
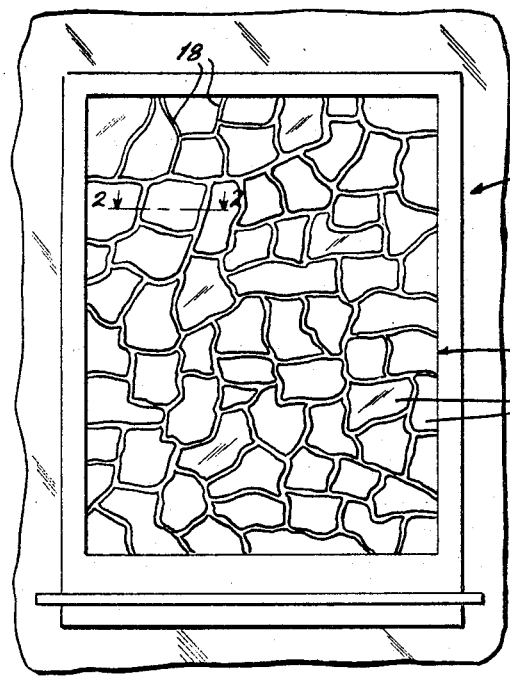
FIG. 1 is an elevational view of a window decorated by means constructed according to the present invention.
Figure 2:
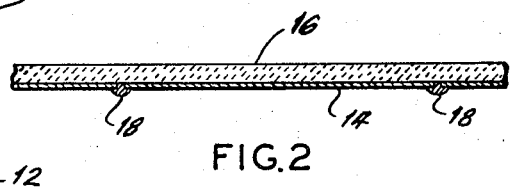
FIG. 2 is an enlarged fragmentary cross-sectional view taken along line 2—2 of FIG. 1.
Figure 4:
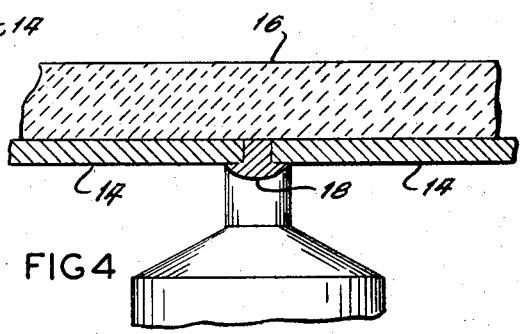
FIG. 4 is a further enlarged fragmentary cross-sectional view illustrating another step in the construction of the subject device.
Figure 3:
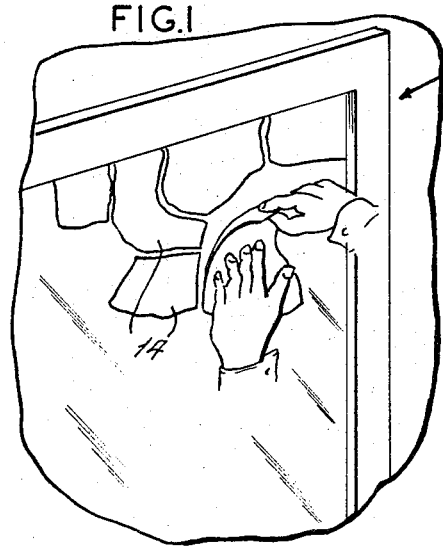
FIG. 3 is a fragmentary perspective view illustrating one step in the construction of the subject device.
Figure 5:
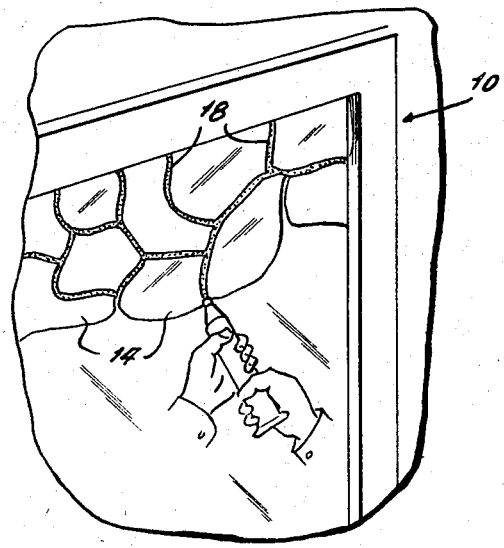
FIG. 5 is a perspective view of a partially completed window display constructed according to the present invention.

Referring to the drawings more particularly by reference numbers, the number 10 refers to a window assembly having a colorful display 12 simulating a stained glass window mounted therein. The display 12 includes a plurality of individual different colored pieces 14 of transparent material which are arranged to provide an attractive and colorful display when light passes through. The colored pieces 14 are positioned in spaced relationship on the window pane 16 and are attached thereto by means of an adhesive 18 which is preferably opaque to simulate the effect produced by the joints of a stained glass window which also provides a color contrasting effect between said pieces and said joint. The colored sections 14 are preferably constructed of a colored transparent material such as cellophane, and the pieces are cut out and positioned against the glass pane 16 in the manner illustrated in FIG. 3. After a piece is formed it is secured to the adjacent pieces and to the window by means of the adhesive 18. It is usually more convenient to apply the adhesive between one or more edges of each new piece 14 and the previously attached pieces. This builds up the pattern a piece at a time and makes it easier to construct.

The adhesive material 18 is preferably, although not necessarily, opaque and if the pattern is to be applied directly to a permanent window pane the adhesive should be such that it can be removed easily by simply pulling it off if a tape adhesive means is used or by scraping it off using a razor blade or other similar scraping tool. A transparent adhesive can also be used in which case it may be desirable to paint over the adhesive and between adjacent pieces to produce a stained glass window effect.

A modified construction 20 is shown in FIGS. 6–9 in which the colored sections 22 are arranged and attached to a piece of clear flexible transparent material 24 which has been cut to a desired window size. In this construction the transparent material 24 is spread out on a table making the arrangement and assembly easier. In this case all or a part of the colored pieces 22 can be arranged on the transparent member 14 and glued or taped at the same time. After the pieces 22 are all attached in place the entire structure can be mounted in the window as shown in FIG. 9. If desired, a strip of edging material such as tape 26 (FIG. 10) can be attached around the edge of the device to hold the edge pieces down on the transparent sheet 24 and to make the structure easier to install and less likely to come apart. The edging material 26 can be adhesive tape folded around the edges of the structure or it can be a more rigid frame member which will retain the finished display in a flat and more permanent condition. Adhesive tape 28 is also used to hold the individual colored pieces in place on the transparent backing shown in FIG. 10. If the device is assembled and constructed on a flexible transparent member 24 as shown in the modified constructions it can be installed in a window using an adhesive tape, small nails, hangers, or other mounting means or fasteners.

The subject invention lends itself to the creation of original decorative windows which will vary in color, originality and attractiveness with the skill and creativeness of the maker. They also lend themselves to depicting religious and other themes and they can be built around a particular design or symbol such as a star, a cross, a Halloween symbol or any other symbol or theme. The materials for making the subject devices can also be packaged in kit form. If desired, the individual colored pieces can be precut at the factory ready for assembly using a suitable cutting die. A typical kit will include a plurality of sheets of different colored transparent paper or cellophane, one or more tubes or other containers of an adhesive material or the equivalent in tape, a transparent backing material or sheet if the modified constructions of FIGS. 6–10 are to be made, and the kit may also include a few sample printed designs or templates which can be positioned behind the window or behind the other transparent member on which the design is to be made to form a pattern for the person constructing the display. The subject device can also be constructed using any other desired pattern simply by placing the pattern behind the transparent member as a guide. The kit may also include a transparent or translucent glue or paste material and a tube of paint and a brush for painting in the spaces between adjacent colored pieces. Other marking means can also be included for shading or marking on the colored pieces themselves, if desired.

Thus the subject device lends itself to the construction of many different kinds of displays and to the artistic talents of the person creating the design and constructing the device.

In FIG. 9 a typical finished display constructed according to the invention is shown positioned in a window behind a lamp so that it may be enjoyed from outside. The same display can be enjoyed from inside during the day.

FIG. 10 shows another modified form of the device using tape instead of glue between adjacent colored pieces. This construction also has a frame member extending around the periphery thereof. The tape may be transparent or opaque. If it is transparent such as Scotch tape, it can be painted over to produce a desired effect.

What is claimed is:

1. A display device comprising a layered structure adapted for mounting in a window or on another light conducting structure to provide a colorful display simulating a stained glass window, said layered structure including a transparent flexible sheet member forming a base layer, a plurality of colored transparent flexible sheet elements shaped and arranged in spaced relationship on the base layer to form a pattern overlay of the colored elements thereon, and contrasting colored adhesive means positioned in and extending across the spaces between the adjacent colored elements bonding the colored elements to the base layer, said layered structure including the base layer and the adhesively attached colored elements being relatively flexible.

2. The display device defined in claim 1 wherein said colored elements are formed of cellophane and said adhesive means are opaque and extend from the spaces between adjacent colored elements to overlap the edge portions of said colored elements.

3. The display means defined in claim 1 including an adhesive strip positioned to extend around the edge portions of the layered structure around the periphery thereof to form an edging therefor, said strip providing an adhesive connection between the edge portions of the base layer on one side of the structure and the portions of the colored elements adjacent thereto.

4. A method of constructing a device to be mounted in a window or like structure to simulate a stained glass window comprising the steps of obtaining a first sheet of transparent flexible material, cutting said sheet to the size and shape of the stained glass window to be simulated, obtaining a plurality of transparent flexible sheets of preselected colors, cutting said different colored sheets into pieces of selected sizes and shapes, arranging said cut pieces in spaced relationship on one surface of the first sheet to form a pattern of the colored pieces thereon, applying a contrasting colored adhesive material in the spaces between the adjacent colored pieces while they are arranged in the pattern on the first sheet, said adhesive material being applied to extend between the edges of the associated colored sheet pieces and to overlap the edge portions thereof to adhesively connect the said pieces to the said first transparent sheet and to each other, and mounting said sheet with the pattern adhesively attached thereto in a window or on another light conducting structure.

References Cited

UNITED STATES PATENTS

| 704,399 | 7/1902 | Taluau | 161—5 XR |
| 704,400 | 7/1902 | Taluau et al. | 161—5 XR |
| 1,813,901 | 7/1931 | Bayne | 156—63 |
| 2,555,505 | 6/1951 | Plumbo | 156—63 XR |
| 2,762,153 | 9/1956 | Knode | 161—3 |
| 2,881,546 | 4/1959 | Gauthier | 156—63 |
| 3,064,380 | 11/1962 | Baut et al. | 156—108 XR |

FOREIGN PATENTS 504,905   5/1939   Great Britain.

ROBERT F. BURNETT, *Primary Examiner.*

W. POWELL, *Assistant Examiner.*

U.S. Cl. X.R.

156—63, 265, 299; 161—38, 39, 44, 413